Patented July 5, 1932

1,866,412

UNITED STATES PATENT OFFICE

GERRIT VAN DER LEE, OF DEVENTER, NETHERLANDS, ASSIGNOR TO NAAMLOOZE VENNOOTSCHAP NOURY & VAN DER LANDE'S HANDELMAATSCHAPPIJ, OF DEVENTER, THE NETHERLANDS

PROCESS FOR ENHANCING THE ACTION OF PERCOMPOUNDS WHICH ARE DECOMPOSED BY CATALASES UPON ANIMAL OR VEGETABLE PRODUCTS

No Drawing. Application filed November 21, 1927, Serial No. 234,921, and in the Netherlands November 25, 1926.

The present invention relates to an improvement in the treatment of organic materials, such as vegetable or animal matter with peroxide compounds such as hydrogen peroxide, acetone peroxide, urea peroxide, sodium perborate, potassium perphosphate and others, while overcoming the unfavorable action of enzymes such as catalases, which are likely to be present in the vegetable or animal matter. As is well known, many vegetable materials and many animal materials contain the enzymes or catalases in question, the normal action of which is to decompose the peroxide compounds with the liberation of molecular oxygen, which latter is substantially useless for effecting any considerable improvement in the vegetable or animal matter, on account of its low activity. If the effect of these enzymes can be reduced or prevented, the oxygen may be liberated largely in a nascent condition in which it is many times more effective for improving the organic material in question.

Many experiments have been conducted for the application of hydrogen peroxide and other inorganic peroxides, perborates, perphosphates and the like, to animal and vegetable matter for improving the same, and in many cases it has been found that the effect was not favorable or was favorable only in a small degree, and it was found that the disturbing influence present is the enzymes or catalases found in the animal or vegetable matter. Thus if one tried to treat products which are rich in catalases, with peroxides as indicated, there may be observed a strong development of molecular oxygen (oxygen gas) which is substantially inert, as regards improving the animal and vegetable matter. On account of the strong liberation of molecular oxygen, only a minor fraction of the total amount of peroxide employed could be effectively utilized in the improvement of the material.

Accordingly it was important to discover some way of counteracting the enzymes or catalases, without introducing other serious objections and without otherwise injuring the animal or vegetable matter, and without otherwise injuring the peroxides employed.

In the course of these researches, I have made the surprising discovery that the decomposition of the peroxide compounds in the presence of catalases and similarly acting enzymes can be strongly retarded, by the addition of small quantities of certain oxidizing agents among which may be mentioned chlorates, perchlorates, bromates, iodates, periodates, persulphates, nitrates, percarbonates, chromates, bichromates (such as those of sodium, potassium, ammonium) as well as the corresponding free acids, chloric acid, perchloric acid, nitric acid, chromic acid. Also ferric salts, for example ferric chloride and nickelic salts such as nickelic sulphate can be employed. Mixtures of two or more of the substances here mentioned can also be used.

It must be emphasized that the retarding action of these oxidizing agents, in the present case refers not particularly to the harmful influence of large quantities of these substances upon the enzymes in question, but rather the retarding action of small quantities of the particluar salt or other oxidizing agent. It is already well known that large quantities of acids, such as sulphuric acid, nitric acid, hydrochloric acid, alkalies such as sodium hydroxide, and various salts for example magnesium sulfate have a harmful influence on enzymes in general, but it does not appear to have been heretofore recognized that the presence of even very small quantities of the oxidizing substances as indicated above, will have a specific retarding action upon enzymes and catalases, the normal action of which is to set free molecular oxygen from certain percompounds such as hydrogen peroxide, acetone peroxide, urea peroxide, percarbonates, perphosphates and metal peroxides such as sodium peroxide. The use of large amounts of these substances would, of course, be impossible in edible products, as herein referred to.

The following examples are given as illustrative of the present invention, showing how strongly the action of catalases can be retarded by the presence of only minute quantities of the oxidizing agents.

Example 1

Wheat flour was taken as an example of a material containing catalases. 10 grams of wheat flour were shaken up with 50 c. c. of water, after which 20 c. c. of hydrogen peroxide (of 1.5%) were added.

In another precisely similar experiment, .02 grams of potassium nitrate were also added.

After both had stood for an hour, the hydrogen peroxide was examined, and in the first experiment, only about 12% of the original amount of hydrogen peroxide remained, while in the second test (with nitrate) about 57% of the original quantity of hydrogen peroxide remained (that is to say nearly five times as much remained in the second case, as in the first case).

Example 2.—Urea peroxide

This has the formula $(CO(NH_2)_2.H_2O_2)$. .5 gram of this material was used with 10 grams of flour, under the conditions of the above experiment, and in a parallel experiment .02 gram of potassium persulphate was employed with the urea peroxide. After standing an hour, it was found that in the first case (without persulphate) 96% of the urea peroxide had been decomposed, while in the second case only 50% had been decomposed.

In other experiments which have been made, on the action of hydrogen peroxide and on the action of substances which contain or which liberate hydrogen peroxide, such substances being brought into contact with animal or vegetable matter containing catalases, such as fibrous materials, hair and the like, gave similar results. In all cases it was found that the decomposition of the peroxide, with the liberation of molecular oxygen, was substantially retarded. This constitutes an important improvement, in that it is possible, in the present case, to secure the major part of the available oxygen content of the hydrogen peroxide (loosely combined oxygen) in the form of nascent oxygen, whereby the baths do not become so quickly exhausted, and by the use of the present invention it is possible to secure the desired result with much smaller quantities of hydrogen peroxide or other peroxides or peroxide compounds. Moreover, in accordance with the present invention, a much greater effect is obtained in a given period of time, with the given quantity of the peroxide or peroxide compounds, than would be obtained if the other substance having oxidizing properties were omitted. It is even possible, when using the other oxidizing substance, which retards the action of the catalases, to secure an equal result with a smaller quantity of peroxide, and in a much shorter time.

An important application of the present invention is the treatment of wheat flour, with a mixture of urea peroxide and say ammonium persulphate. Thus it is possible to secure excellent improvement of the flour, by the employment of 10 grams of a mixture of 1.5 parts of urea peroxide and 1 part of ammonium persulphate, per 100 kilos of flour. These quantities would represent 0.01% of the mixture of urea peroxide and ammonium persulfate, or 0.006% of the urea peroxide and 0.004% of the ammonium persulfate. These quantities are quite small as compared with the prior art, see U. S. patent to Sutherland 1,539,701 in which 0.025% of benzoyl peroxide is recommended as a suitable quantity of this material, to add to flour. In the present case I prefer to use only about one-fourth as much of the urea peroxide. It is also possible to use, with this amount of flour, 5 grams of a mixture of 4 parts of 30% hydrogen peroxide and 1 part of potassium bromate with 100 kilos of flour. Generally speaking one oxidizing agent may work more advantageously with one particular peroxide compound, while a different peroxide compound might be more advantageously employed in conjunction with a different oxidizing agent or different mixture of oxidizing agents, and furthermore it is obvious that some of the oxidizing agents above listed would be more advisable with one particular vegetable or animal product to be treated, than another.

Special attention ought to be given to the proportion of the catalases found in the particular vegetable or animal substance to be treated, those which contain a relatively large amount of the catalases ordinarily requiring larger quantities of the oxidizing substances, to retard their action.

I am aware that it has heretofore been proposed, in treating vegetable material, say flour, with peroxide compounds to add substances or mixtures of substances, for the purpose of stabilizing the hydrogen peroxide before bringing the same into contact with the flour. In accordance with the present invention, it is immaterial whether the oxidizing substance added has this effect or not. Thus for instance such compounds as uric acid, barbituric acid, sulphuric acid and the like may enhance the stability of hydrogen peroxide or peroxide compounds, but these substances would not be suitable for retarding the action of the catalases in accordance with the present invention.

It will furthermore be obvious that in order to avoid decomposition of the peroxide or peroxide compounds, the same, or mixture of the same should not be brought into contact with metallic copper or metallic iron, or such salts of these metals as cause rapid decomposition of the peroxide or peroxide compounds.

Of course it is obvious that substances to prevent the spontaneous decomposition of hydrogen peroxide can be added to the hydrogen peroxide, or can be initially present therein, without departing from the spirit of the invention, so long as such substances are not injurious to the action of the oxidizing salts or do not decompose the said oxidizing salt, added in accordance with the present invention. Often it may be found that the presence of certain substances which by themselves prevent the spontaneous decomposition of hydrogen peroxide or other peroxides, may assist in the present invention. For example a small amount of sulphuric acid present in hydrogen peroxide reduces the tendency of the latter to spontaneous decomposition, and the presence of this amount of acid may also to some extent reduce the activity of the enzymes above referred to.

It is further to be understood that the present invention does not preclude the use of subsequent treatments of the organic material, to enhance the activity of the peroxide or peroxide compounds, such treatments as treating with actinic light, heating, leaving the substances treated to stand, or a combination of two or more of such treatments can also be applied.

In the appended claims, the expression "peroxide compound" includes not only hydrogen peroxide itself, but compounds of peroxide, such as those enumerated above. Likewise the expression "an oxidizing agent" is intended to embrace the use of one or more of such agents.

As preferred illustrations, I call attention to the use of hydrogen peroxide, urea peroxide and sodium perborate, with a persulphate such as sodium or potassium persulphate, a bromate such as sodium or potassium bromate, or a mixture of these two oxidizing agents.

I call attention to the fact that when the peroxide compound and oxidizing agent, as above described, are added to the flour or other milling product, and the latter is not subsequently washed to remove these added chemicals, the latter can be shown by chemical methods to be present, to some extent at least, in the treated product, at least for a considerable time. Hence the products are distinguishable from the untreated products, at least for a considerable time, by the presence of small amounts of the peroxide and of the oxidizing agent. The usual chemical tests for these substances can be employed.

I claim:—

1. In the process of improving animal or vegetable substances by treatment with peroxide compounds which peroxide compounds are normally capable of being decomposed by catalases with liberation of molecular oxygen, the improvement which comprises effecting such treatment in the presence of a small quantity of an agent which is a chemical compound containing an acid radical, which compound has a strong oxidizing action and is capable of largely preventing the action of catalases upon the peroxide compound.

2. In the process of improving animal or vegetable substances by treatment with peroxide compounds, which peroxide compounds are normally capable of being decomposed by catalases with liberation of molecular oxygen, the improvement which comprises effecting such treatment in the presence of a small quantity of at least one substance selected from the herein described group consisting of chlorates, perchlorates, bromates, iodates, periodates, persulphates, nitrates, percarbonates, chromates, bichromates, and the corresponding free acids, ferric salts, nickelic salts and sulphuric acid, said substances being capable of substantially retarding the decomposition of the peroxide compounds by the catalases.

In testimony whereof I affix my signature.

GERRIT van der LEE.